United States Patent
Nabata et al.

(10) Patent No.: US 6,214,093 B1
(45) Date of Patent: Apr. 10, 2001

(54) FILTER MEDIUM FOR AIR FILTERS

(75) Inventors: Norikane Nabata; Eizo Kawano; Takuya Maeoka, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/343,688

(22) Filed: Jun. 30, 1999

(30) Foreign Application Priority Data

Jul. 8, 1998 (JP) .................................... 10-193204
May 18, 1999 (JP) .................................... 11-136882

(51) Int. Cl.$^7$ ............................ B01D 63/00; B01D 71/36
(52) U.S. Cl. .................................. 96/11; 55/486; 55/487
(58) Field of Search ........................ 96/11, 12; 55/486, 55/487

(56) References Cited

U.S. PATENT DOCUMENTS

| | | | |
|---|---|---|---|
| 4,324,574 | * 4/1982 | Fagan ........................... | 55/487 |
| 4,385,093 | 5/1983 | Hubis . | |
| 4,767,426 | * 8/1988 | Daly et al. ...................... | 55/528 |
| 4,877,433 | * 10/1989 | Oshitari ......................... | 55/486 |
| 4,983,434 | * 1/1991 | Sassa ............................ | 55/486 |
| 5,019,140 | * 5/1991 | Bowser et al. .................... | 55/486 |
| 5,096,473 | * 3/1992 | Sassa et al. ..................... | 55/486 |
| 5,108,474 | * 4/1992 | Riedy et al. ..................... | 55/486 |
| 5,154,827 | * 10/1992 | Ashelin et al. ................... | 96/12 |
| 5,234,739 | 8/1993 | Tanaru et al. . | |
| 5,478,372 | * 12/1995 | Stark ............................ | 55/528 |
| 5,500,167 | 3/1996 | Degen . | |
| 5,507,847 | 4/1996 | George et al. . | |
| 6,030,428 | * 2/2000 | Ishino et al. .................... | 55/486 |
| 6,030,484 | * 2/2000 | Maeoka et al. ................... | 55/486 |

FOREIGN PATENT DOCUMENTS

| | | |
|---|---|---|
| 0 087149A2 | 8/1983 | (EP) . |
| 0 433 787 A1 | 6/1991 | (EP) . |
| 0 576 343 A2 | 12/1993 | (EP) . |
| 0 633 053 A1 | 1/1995 | (EP) . |
| 0 707 033 A1 | 4/1996 | (EP) . |
| 0 808 648 A1 | 11/1997 | (EP) . |
| 57-131236 | 8/1982 | (JP) . |
| 3-179038 | 8/1991 | (JP) . |
| 3-221541 | 9/1991 | (JP) . |
| 7-196831 | 8/1995 | (JP) . |
| 9-504737 | 5/1997 | (JP) . |
| WO 91/10495 | 7/1991 | (WO) . |
| WO 94/16802 | 8/1994 | (WO) . |

* cited by examiner

Primary Examiner—Duane S. Smith
(74) Attorney, Agent, or Firm—Sughrue, Mion, Zinn, Macpeak & Seas, PLLC

(57) ABSTRACT

A filter medium for air filters wherein the collection performance of polytetrafluoroethylene (PTFE) membranes is not damaged even after processing, for example, pleating and bonding to air-permeable supporting members. The filter medium containing a laminate (2) containing at least three layers of porous PTFE membranes wherein the pressure drop of a porous PTFE membrane (4) located as an outermost layer has a pressure drop of 1/2 times or less the pressure drop of porous PTFE membrane (5) located as at least one intermediate layer. Air-permeable supporting members (3) are bonded to both outermost layers of the laminate (4) to obtain a filter medium for air filters (1).

4 Claims, 1 Drawing Sheet

FILTER MEDIUM FOR AIR FILTERS

FIELD OF THE INVENTION

This invention relates to filter media for air filters using a porous polytetrafluoroethylene (hereinafter referred to as "PTFE" for simplicity) membrane.

BACKGROUND OF THE INVENTION

As filter media for air filters, there have been frequently used those produced by blending glass fibers with binders and processing into a paper. However, these filter media suffer from some problems, for example, self-dusting due to fine fibers contained therein and dusting caused by deterioration due to chemicals such as hydrofluoric acid. In recent years, therefore, porous PTFE membranes, which are clean materials and highly resistant to chemicals, have been employed as filter media for air filters in the fields of semiconductor industry, etc. A porous PTFE membrane can be produced by molding PTFE into sheet and then stretching the sheet to thereby make it porous (see, for example, JP-A-7-196831 and JP-A-6-816802 (PCT); the term "JP-A" as used herein means an "unexamined published Japanese patent application"). Sole use of a porous PTFE membrane thus obtained lacks rigidity. Therefore, in many cases the porous PTFE membrane is used by bonding an air-permeable supporting member to one surface there. The filter medium thus reinforced by the air-permeable supporting member is pleated so as to give a continuous W-shaped structure (hereinafter referred to as "pleating") and employed as a filter medium unit.

On the other hand, there are proposed various methods for producing laminates of porous PTFE membranes (see, for example, JP-A-57-131236 and JP-A-3-179038). JP-A-9-504737 (PCT) proposes a filter medium using such a laminate.

Namely, JP-A-9-504737 (PCT) discloses a filter medium showing a high collection efficiency which comprises a laminate comprising five layers of porous PTFE membranes having the same pressure drop, and air-permeable supporting members located at both sides of the laminate. In this filter medium, the air-permeable supporting members are loosely pleated together with the porous PTFE membrane laminate but not bonded thereto.

In a filter medium having an air-permeable supporting member bonded to one surface of a porous PTFE membrane, however, some of pores of the porous PTFE membrane are clogged by bonding and thus the pressure drop largely increases. On the other hand, a filter medium having air-permeable supporting members located at both sides of a laminate does not suffer from any decrease in the pressure drop, since the supporting members are not bonded to the laminate. In this case, however, the laminate and the supporting members are not integrated and thus are poor in handling characteristics. In this case, furthermore, the supporting members are not bonded to the laminate and thus sometimes give deviations in the step of the pleating, thereby causing undesirable bends in the laminate or supporting members.

SUMMARY OF THE INVENTION

The present invention has been made to overcome the above-described problems encountering in the prior art.

Accordingly, an object of the present invention is to provide a filter medium for air filters being capable of exerting the collection performance inherent to porous PTFE membranes even after processing (for example, pleating, bonding to air-permeable supporting members, etc.) and showing excellent processability and handling characteristics by improving the porous PTFE membrane laminate.

To achieve the above object, the present invention uses a porous membrane capable of sufficiently relieving influence of the processing as described above as the outermost layer of a laminate of porous PTFE membranes.

The filter medium for air filters according to the present invention comprises as a collection layer a laminate comprising at least three layers of porous PTFE membranes, wherein the laminate comprises a first porous PTFE membrane located as an outermost layer and a second porous PTFE membrane located as at least one intermediate layer excluding the outermost layer, and the first porous PTFE membrane has a pressure drop of ½ time or less a pressure drop of the second porous PTFE membrane.

Figure 1:
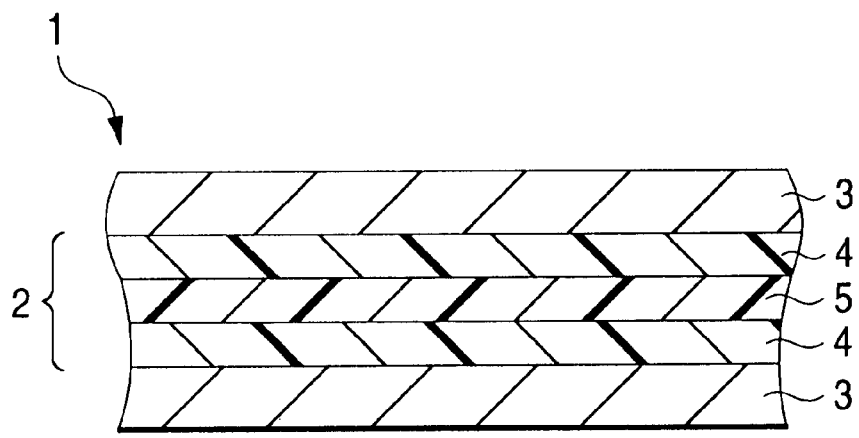
FIG. 1 is a sectional view showing one example of a constitution of the filter medium for air filters according to the present invention.

In these drawings, each numerical symbol shows as follows:

1, 10: Filter medium for air filter
2: Porous PTFE membrane laminate
3: Air-permeable supporting member
4: Porous PTFE membrane as outermost layer
5: Porous PTFE membrane as intermediate layer

DETAILED DESCRIPTION OF THE INVENTION

In the filter medium for air filters according to the present invention, the first porous PTFE membrane located as the outermost layer serves to relieve influence of processing (bonding to the air-permeable supporting members, pleating, etc.) on the second porous PTFE membrane located as the intermediate layer. Although the bonding of the air-permeable supporting member to the first porous PTFE membrane located as the outermost layer also results in increase of the pressure drop in the present invention, the degree of the increase is small compared with the conventional cases. Namely, the collection performance of the filter medium is not seriously affected thereby. Moreover, the first porous PTFE membrane located as the outermost layer is physically shocked in the pleating step and thus relieves the impact applied to the second porous PTFE membrane located as the intermediate layer, thus relieving the influence on the collection performance as a filter medium.

In the filter medium for air filters according to the present invention, it is preferable that air-permeable supporting members are bonded to both outermost layers of the above-described laminate comprising porous PTFE membranes. This bonded structure facilitates handling of the filter medium and enables stable pleating.

In the filter medium for air filters of the present invention, any excessive increase in the pressure drop due to the bonding of the air-permeable supporting members can be prevented not only in a case where the air-permeable supporting members are bonded to the laminate with an adhesive, etc., but also in a case where the air-permeable supporting members are fusion-bonded to the laminate. That is to say, the pressure drop of the filter medium for air filters can be regulated to a level of 1.15 times or less (1 to 1.15 times) the pressure drop of the laminate, even though the filter medium includes air-permeable supporting members bonded to the outermost layers of the laminate by an appropriate means.

The embodiment of the present invention will be described by reference to the accompanying drawings.

FIG. 1 is a sectional view showing one example of a constitution of the filter medium for air filters according to the present invention. In the filter medium for air filters (1) of FIG. 1, air-permeable supporting members (3,3) are bonded to the outermost layers of a laminate (2) of porous PTFE membranes. The laminate (2) includes porous PTFE membranes (4,4) located as the outermost layers and a porous PTFE membrane (5) located as the intermediate layer. The porous PTFE membranes (4,4) located as the outermost layers relieve the influence of the bonding to the air-permeable supporting members (3,3) and pleating on the collection performance. It is also possible to use the porous PTFE membrane laminate (2) as such as a filter medium.

A porous PTFE membrane can be obtained by molding a mixture of a fine PTFE powder with a liquid lubricant into a sheet by extrusion and/or rolling, removing the liquid lubricant from the unsintered sheet thus obtained and then making the sheet porous by stretching. The strength of the membrane can be further improved by sintering the thus stretched sheet by heating to the melting point of PTFE or higher. The above-described porous PTFE membrane laminate (2) can be produced by adding the step of laminating porous PTFE membranes at an arbitrary stage in the conventional process for producing porous PTFE membranes. Examples of processes for producing porous PTFE membranes including the lamination step are described below.

1) A pre-molded product in which a plurality of layers containing a fine PTFE powder and a liquid lubricant are laminated is prepared. This pre-molded product is successively subjected to extrusion, rolling, stretching, etc., to obtain a laminate of porous PTFE membranes.

2) A plurality of unsintered PTFE sheets containing the liquid lubricant are laminated. The thus obtained laminate is successively subjected to rolling, stretching, etc., as in the conventional production methods to obtain a laminate of porous PTFE membranes.

3) A plurality of unsintered porous PTFE membranes are press-bonded to form a laminate.

The porous structure of a porous PTFE membrane is affected by the materials used and conditions in the rolling and stretching steps. In a porous PTFE membrane laminate, the materials and the processing conditions are adjusted every layer. The adjustment is conducted by, for example, controlling a molecular weight of the fine PTFE powder, the rolling conditions for forming an unsintered PTFE sheet, the stretching conditions for making an unsintered porous PTFE membrane porous, etc., although not particularly limited.

It is difficult to measure the pressure drop of each layer of the porous PTFE membrane laminate thus obtained. However, the pressure drop of each layer can be evaluated by individually preparing the layers using the materials and conditions in rolling, stretching, etc., which are employed in the production of the laminate (i.e., the first and second porous PTFE membranes constituting the laminate are prepared individually under the same conditions as those employed in the production of the laminate and evaluation is made on the state of the thus prepared membrane).

The pressure drop of the porous PTFE membrane (4) provided as the outermost layer and that of the porous PTFE membrane (5) provided as the intermediate layer can be measured respectively by the methods as will be described hereinafter. It is preferable that the pressure drop of the porous PTFE membrane (4) provided as the outermost layer be 2 to 15 mmH$_2$O, and the pressure drop of the porous PTFE membrane (5) provided as the intermediate layer be 10 to 30 mmH$_2$O. It is ascertained to be preferable that the pressure drop of the porous PTFE membrane as the outermost layer is fallen within the range of 10 to 50% of the pressure drop of the porous PTFE membrane as the intermediate layer.

Figure 2:
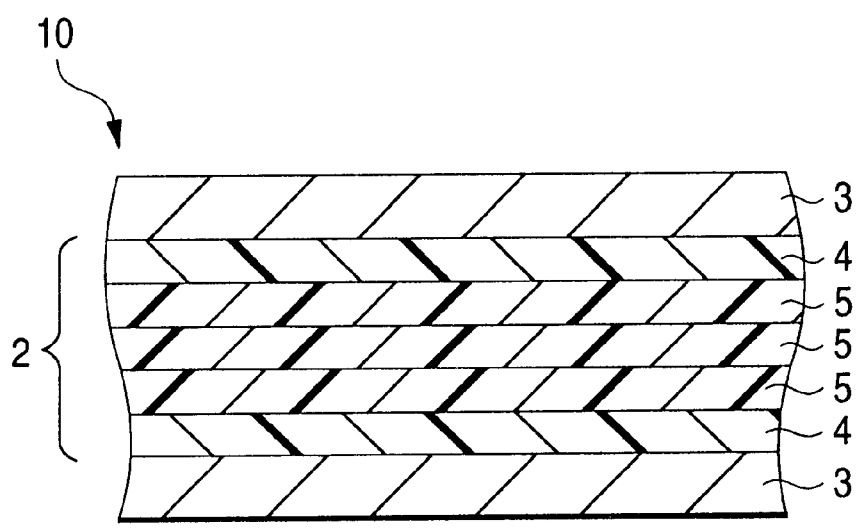
FIG. 2 is a sectional view showing another example of a constitution of the filter medium for air filters according to the present invention.

It is not always necessary that porous PTFE membranes (4) provided as the outermost layers have the same pressure drop, so long as each porous PTFE membrane (4) has a pressure drop of ½ or less the pressure drop of the porous PTFE membrane (5) provided as the intermediate layer. Also, the number of the porous PTFE membranes in the laminate (2) is not limited to 3, and the laminate may be composed of four, five or more layers (see FIG. 2). In the case of a filter medium for air filters (10) having two or more porous PTFE membranes (5) as the intermediate layers, the pressure drop of the porous PTFE membrane (4) as the outermost layer may be ½ or less as much as that of the porous PTFE membrane (5) showing the largest pressure drop among the porous PTFE membranes provided as the intermediate layers.

It is preferable that the intermediate layers includes a porous PTFE membrane having a PF (Performance of Filter) value, which indicates the collection performance, exceeding 20, preferably from 21 to 40. The PF value is calculated in accordance with the following formula (1).

$$\text{PF value} = -\log(1-E/100)/L \times 100 \tag{1}$$

In the above formula (1), L means a pressure drop. More specifically, L is a pressure drop value (expressed in mmH$_2$O) determined with a manometer by setting a sample (a porous PTFE membrane, etc.) in a circular holder having an effective area of 100 cm$^2$ and permeating air at a face velocity of 5.3 cm/sec through the sample. E means a collection efficiency. More specifically, E is a ratio calculated in accordance with the following formula (2) by setting a sample in the same holder as in the measurement of the pressure drop, permeating air through the sample at the same face velocity while supplying polydispersed dioctyl phthalate (DOP) of 0.1 to 0.2 µm in particle size as an aerosol at a rate to give a concentration of about 108 particles/liter and then measuring the particle concentration in the upstream part and the concentration of the particles in the downstream part with a laser particle counter (LPC).

$$\text{Collection efficiency } (E) = (1 - C_D/C_U) \times 100 \tag{2}$$

In the above formula (2), $C_D$ means the particle concentration in the downstream part, and $C_U$ means the particle concentration in the upstream part.

The air-permeable supporting member (3) may be an arbitrary one, so long as it is superior in air-permeability to the porous PTFE membrane. Examples of the material therefor include non-woven fabrics, woven-fabrics, meshes and other porous materials. Although the air-permeable supporting member (3) is not limited in material, structure or form, it is preferable to use non-woven fabrics therefor from the standpoints of strength, flexibility and workability. It is more preferable to use a non-woven fabric comprising a composite fiber having a core-shell structure wherein the melting point of the core component is higher than that of the shell component, since such a non-woven fabric can be easily bonded.

The air-permeable supporting member is bonded to the laminate of the porous PTFE membranes by using an adhesion member such as an adhesive. Alternatively, the air-permeable supporting member may be partly molten by heating and then fusion-bonded to the laminate. If such a bonding method is applied to a conventional porous PTFE membrane, pores of the porous PTFE membrane are clogged with the molten air-permeable supporting member or the adhesion member and the air-permeability lowers, thereby deteriorating the inherent performance of the porous PTFE membrane. In contrast to this, the above-described laminate of the porous PTFE membranes can relieve the influence of lowering the air-permeability.

Since the influence of lowering the air-permeability can be thus relieved, the present invention makes it possible to obtain a filter medium for air filters having a PF value of 17 or above, even though the air-permeable supporting members are bonded to both outermost layers of the porous PTFE membrane laminate.

In filter media for air filters, it is preferable that porous PTFE membranes are bonded to each other, since filter media having such a structure can be easily handled and pleated in a stable state.

The present invention will be described in greater detail by reference to the following Examples, but it is should be understood that the invention is not construed as being limited thereto. In these Examples, pressure drop, collection efficiencies and PF values were determined by the above-described respective methods. On the other hand, a leakage performance was determined by the following method.

(Leakage performance)

Samples (filter media) were pleated using a reciprocating pleating machine. The collection performance of each sample thus pleated was measured by the same method as the above-described one. The concentration of the particles in the upstream part and the concentration of the leaked particles in the downstream part were measured with a particle counter and the particle penetration was calculated in accordance with the following formula (3).

$$\text{Particle penetration (P)}=(P_D/P_U)\times 100 \quad (3)$$

In the above formula (3), $P_D$ means the particle penetration in the downstream part, and $P_U$ means the particle penetration in the upstream part.

The particle penetration ($P_{0.1}$) having a particle size of from 0.1 to 0.2 μm and the particle penetration ($P_{0.2}$) having a particle size of from 0.2 to 0.3 μm were determined. When the following relationship (4) was satisfied, it was considered that leakage arose.

$$P_{0.2}/P_{0.1}>0.1 \quad (4)$$

The leakage performance was evaluated by measuring the particle penetration at 60 points in each sample and calculating the leakage frequency.

EXAMPLE 1

100 Parts by weight of a fine PTFE powder (Fluon CD-014, manufactured by Asahi-ICI Fluoropolymers; hereinafter referred to as "fine PTFE powder A") was uniformly mixed with 35 parts by weight of a liquid lubricant (liquid paraffin). The resulting mixture was pre-molded at 20 kg/cm² and then paste-molded into a rod by extrusion. The molded article in the form of rod was passed between a pair of metal rolls to obtain a continuous sheet having a thickness of 500 μm ("rolled sheet A").

Separately, 100 parts by weight of another fine PTFE powder (Fluon CD-123, manufactured by Asahi-ICI Fluoropolymers; hereinafter referred to as "fine PTFE powder B") was uniformly mixed with 25 parts by weight of a liquid lubricant (liquid paraffin). The resulting mixture was pre-molded at 20 kg/cm² and then paste-molded into a rod by extrusion. The molded article in the form of a rod was passed between a pair of metal rolls to give a continuous sheet having a thickness of 300 μm ("rolled sheet B").

After superposing the rolled sheet A on both surfaces of the rolled sheet B, the resulting composite was integrated by passing it between a pair of metal rolls to obtain a molded article in the form of a sheet having a thickness of 900 μm. The liquid lubricant was removed from the sheet by the extraction method using Trichlene to obtain an unsintered PTFE laminate. This unsintered PTFE laminate was stretched by rolling 20-fold in the lengthwise direction of the sheet at a stretching temperature of 290° C. The laminate was further stretched by tentering 30-fold in the width direction of the sheet at a stretching temperature of 80° C., thereby obtaining an unsintered porous PTFE membrane. This unsintered porous PTFE membrane of the three-layered structure was heated to 400° C. for 20 seconds while fixing dimensionally to obtain a filter medium comprising a three-layered porous PTFE membrane laminate having a thickness of about 42 μm ("filter medium 1").

A polyethyelene terephthalate (PET)/polyester (PE) core-shell type non-woven fabric having a thickness 150 μm and a basis weight of 30 g/m² (ELEVES T0303WDO, manufactured by Unitika Ltd., melting point of the shell: 129° C.) was laminated onto both surfaces of the filter medium 1 by the heat-lamination method using a pair of rolls (roll temperature: 140° C.), thereby obtaining a filter medium having the same structure as shown in FIG. 1 wherein the porous PTFE membrane laminate was sandwiched between the non-woven fabrics ("filter medium 2").

To evaluate the characteristics of each layer constituting the filter medium 1, the rolled sheet A alone was passed between a pair of metal rolls to obtain a molded article in the form of a sheet having a thickness of 350 μm. This molded article was subjected to removal of the liquid lubricant, stretching and heat treatment each in the same manner as described above to obtain a porous PTFE membrane having a thickness of about 16 μm ("outer layer membrane A").

Similarly, the rolled sheet B alone was passed between a pair of metal rolls to obtain a molded article in the form of a sheet having a thickness of 200 μm. This molded article was subjected to removal of the liquid lubricant, stretching and heat treatment each in the same manner as described above to obtain a porous PTFE membrane having a thickness of about 8 μm ("intermediate layer membrane A").

EXAMPLE 2

The outer layer membrane A was superposed on both surfaces of the intermediate layer membrane A obtained in the same manner as in Example 1. Further, the same PET/PE core-shell non-woven fabric as used in Example 1 was laminated by the heat-lamination method (roll temperature: 140° C.) on both surfaces thereof to obtain a filter medium having a multi-layered porous PTFE membrane sandwiched between non-woven fabrics ("filter medium 3").

EXAMPLE 3

100 Parts by weight of the fine PTFE powder A was uniformly mixed with 35 parts by weight of a liquid lubricant (liquid paraffin). The resulting mixture was pre-molded at 20 kg/cm² and then paste-molded into a rod by extrusion. The molded article in the form of a rod was passed between a pair of metal rolls to obtain a continuous sheet having a thickness of 350 μm ("rolled sheet C").

Separately, 100 parts by weight of the fine PTFE powder B was uniformly mixed with 25 parts by weight of a liquid lubricant (liquid paraffin). The resulting mixture was pre-molded at 20 kg/cm² and then paste-molded into a rod by extrusion. The molded articles in the form of a rod was passed between a pair of metal rolls to obtain a continuous sheet having a thickness of 200 μm ("rolled sheet D").

The liquid lubricant was removed from each of the rolled sheets C and D by the extraction method using Trichlene to obtain unsintered PTFE sheets. These unsintered PTFE sheets were stretched by rolling 20-fold in the lengthwise direction at a stretching temperature of 290° C. Thus a stretched PTFE sheet C and a stretched PTFE sheet D were obtained from the rolled sheet C and the rolled sheet D, respectively. The stretched PTFE sheet C was superposed on both surfaces of the stretched PTFE sheet D and the resulting composite sheet was stretched by tentering 30-fold in the width direction at a stretching temperature of 80° C., thereby obtaining an unsintered porous PTFE membrane. This unsintered porous PTFE membrane of the three-layered structure was heated to 400° C. for 20 seconds while fixing dimensionally to obtain an objective filter medium comprising a sintered, three-layered porous PTFE membrane laminate having a thickness of about 39 μm ("filter medium 4").

The above-described PET/PE core-shell type non-woven fabric having a thickness of 150 μm and a basis weight of 30 g/m² was laminated onto both surfaces of the filter medium 4 by the heat-lamination method (roll temperature: 140° C.), thereby obtaining a filter medium having the porous PTFE membrane laminate sandwiched between the non-woven fabrics ("filter medium 5").

To evaluate the characteristics of each layer constituting the filter medium 4, the stretched PTFE sheet C was stretched by tentering and heated in the same manner as above to obtain a porous PTFE membrane having a thickness of about 16 μm ("outer layer membrane B").

Similarly, the stretched PTFE sheet D was stretched by tentering and heated to obtain a porous PTFE membrane having a thickness of about 8 μm ("intermediate layer membrane B")

EXAMPLE 4

100 Parts by weight of the fine PTFE powder A was uniformly mixed with 35 parts by weight of a liquid lubricant (liquid paraffin). The resulting mixture was pre-molded at 20 kg/cm² and then paste-molded into a rod by extrusion. The molded article in the form of a rod was passed between a pair of metal rolls to obtain a continuous sheet having a thickness of 500 μm. This molded article in the form of a sheet containing the liquid lubricant was stretched by rolling 2-fold in the lengthwise direction at a stretching temperature of 50° C. to obtain a stretched PTFE sheet.

The procedure of Example 1 was repeated except for using this stretched PTFE sheet as a substitute for the rolled sheet A to obtain a filter medium comprising a sintered, three-layered porous PTFE membrane laminate having a thickness of about 29 μm ("filter medium 6"). The non-woven fabric was heat-laminated on the both surfaces of this filter medium 6 in the same manner as Example 1 to obtain another filter medium ("filter medium 7").

To evaluate the characteristics of each layer constituting the filter medium 6, the stretched PTFE sheet alone was passed between metal rolls to obtain a continuous sheet having a thickness of 230 μm. This molded article in the form of a sheet was subjected to stretching, etc., as in the production of the filter medium 6 to obtain a porous PTFE membrane having a thickness of about 10 μm ("outer layer membrane C"). For the evaluation of the intermediate layer in this Example, the intermediate layer membrane A was used in the same manner as in Example 1.

COMPARATIVE EXAMPLE 1

The procedure of Example 1 was repeated except for using a fine PTFE powder (Polyflon F-104U, manufactured by Daikin Industries, Ltd.; hereinafter referred to as "fine PTFE powder C") as a substitute for the fine PTFE powder A to obtain a filter medium comprising a sintered, three-layered porous PTFE membrane laminate having a thickness of about 38 μm ("filter medium 8"). Further, another filter medium having the filter medium 8 sandwiched between the non-woven fabrics was obtained ("filter medium 9").

To evaluate the characteristics of each layer constituting the filter medium 8, the stretched sheet obtained using the fine PTFE powder C alone was passed between metal rolls to obtain a continuous sheet having a thickness of 350 μm. This molded article in the form of a sheet was subjected to stretching, etc., as in the production of the filter medium 8 to obtain a porous PTFE membrane having a thickness of about 16 μm ("outer layer membrane D"). For the evaluation of the intermediate layer in this Example, the intermediate layer membrane A was used in the same manner as in Example 1.

COMPARATIVE EXAMPLE 2

The procedure for producing the rolled sheet B in Example 1 was repeated except for using the fine PTFE powder A as a substitute for the fine PTFE powder B to obtain a continuous sheet having a thickness of 300 μm ("rolled sheet E"). The procedure of Example 1 was repeated except for superposing the rolled sheet A on both surfaces of the rolled sheet E to obtain a filter medium comprising a sintered, three-layered porous PTFE membrane laminate having a thickness of about 43 μm ("filter medium 10"). The non-woven fabric was laminated on both surfaces of this filter medium 10 by the heat lamination method as in Example 1 to obtain another filter medium ("filter medium 11").

The rolled sheet alone was passed between metal rolls to obtain a continuous sheet having a thickness of 320 μm. This molded article in the form of a sheet was subjected to stretching, etc., as in the production of the intermediate layer membrane A in Example 1 to obtain a porous PTFE membrane having a thickness of about 10 μm ("intermediate layer membrane C"). For the evaluation of the outer layer in this Example, the outer layer membrane A was used in the same manner as in Example 1.

COMPARATIVE EXAMPLE 3

100 Parts by weight of the fine PTFE powder B was uniformly mixed with 25 parts by weight of a liquid lubricant (liquid paraffin). The resulting mixture was pre-molded at 20 kg/cm² and then paste-molded into a rod by extrusion. The molded article in the form of a rod was passed between a pair of metal rolls to obtain a continuous sheet having a thickness of 250 μm. The liquid lubricant was eliminated from this molded article in the form of a sheet by the extraction method using Trichlene to obtain an unsintered PTFE sheet. This unsintered PTFE sheet was stretched by rolling 15-fold in the lengthwise direction at a stretching temperature of 290° C. Subsequently, the sheet was further stretched by tentering 30-fold in the width direction at a stretching temperature of 80° C. to obtain an unsintered porous PTFE membrane. This unsintered porous PTFE membrane was heated to 400° C. for 20 seconds while fixing dimensionally to obtain a sintered porous PTFE membrane having a thickness of about 13 μm ("single-layered porous PTFE membrane").

The above-described PET/PE core-shell type non-woven fabric having a thickness of 150 μm and a basis weight of 30 g/m$^2$ was laminated onto both surfaces of this single-layered porous PTFE membrane by the heat-lamination method (roll temperature: 140° C.), thereby obtaining a filter medium having the porous PTFE membrane laminate sandwiched between the non-woven fabrics ("filter medium 12").

Table 1 shows the pressure drops and collection efficiencies of the filter media, outer layer membranes, intermediate layer membranes and single-layered porous PTFE membrane obtained in the above Examples and Comparative Examples.

TABLE 1

| | Sample | Pressure drop (mmH$_2$O) | Collection efficiency (%) | Pressure drop ratio of outer layer and intermediate layer (pressure drop of outer layer/pressure drop of intermediate layer) |
|---|---|---|---|---|
| Ex. 1 | filter medium 1 | 37.3 | 99.999993 | 0.33 |
| | outer layer membrane A | 7.3 | 90 | |
| | intermediate layer membrane A | 22.4 | 99.9992 | |
| Ex. 2 | outer layer membrane A | 7.3 | 90 | 0.33 |
| | intermediate layer membrane A | 22.4 | 99.9992 | |
| Ex. 3 | filter medium 4 | 36.8 | 99.999996 | 0.33 |
| | outer layer membrane B | 7.3 | 92 | |
| | intermediate layer membrane B | 22.4 | 99.999 | |
| Ex. 4 | filter medium 6 | 32.8 | 99.99993 | 0.24 |
| | outer layer membrane C | 5.3 | 78 | |
| | intermediate layer membrane A | 22.4 | 99.9992 | |
| Comp. Ex. 1 | filter medium 8 | 51.6 | >99.999999 | 0.69 |
| | outer layer membrane D | 15.5 | 99.94 | |
| | intermediate layer membrane A | 22.4 | 99.992 | |
| Comp. Ex. 2 | filter medium 10 | 22.5 | 99.91 | 1.07 |
| | outer layer membrane A | 7.3 | 90 | |
| | intermediate layer membrane C | 6.8 | 85 | |
| Comp. Ex. 3 | single-layered porous PTFE membrane | 37.8 | 99.999998 | — |

Table 2 shows the pressure drops, collection efficiencies and PF values of the filter media obtained in the above Examples and Comparative Examples.

TABLE 2

| | | Pressure drop (mmH$_2$O) | Collection efficiency (%) | Increase in pressure drop in heat-lamination (%) | PF value |
|---|---|---|---|---|---|
| Ex. 1 | filter medium 1 | 37.3 | 99.999993 | 8.0 | 17.9 |
| | filter medium 2 | 40.3 | 99.999994 | | |
| Ex. 2 | filter medium 3 | 39.8 | 99.999991 | 7.6 | 17.7 |
| Ex. 3 | filter medium 4 | 36.8 | 99.999996 | 7.9 | 17.6 |
| | filter medium 5 | 39.7 | 99.99999 | | |
| Ex. 4 | filter medium 6 | 32.8 | 99.99993 | 7.9 | 18.1 |
| | filter medium 7 | 35.4 | 99.99996 | | |
| Com. Ex. 1 | filter medium 8 | 51.6 | >99.999999 | 18.3 | — |
| | filter medium 9 | 61.0 | >99.999999 | | |
| Com. Ex. 2 | filter medium 10 | 22.5 | 99.91 | 8.2 | 12.3 |
| | filter medium 11 | 24.3 | 99.9 | | |
| Com. Ex. 3 | single-layered porous PTFE membrane | 37.8 | 99.999998 | 19.5 | — |
| | filter medium 12 | 45.2 | >99.999999 | | |

The "increase in pressure drop in heat-lamination (%)" in Example 2 was calculated from the pressure drop of the filter medium 4 and the pressure drop observed by superposing the outer layer membrane A on both surfaces of the intermediate layer membrane A obtained in Example 1.

As shown in Table 2, each of the filter media 1 to 7, wherein the pressure drop of the outer layer membrane was regulated to a level ½ time or less as much as the pressure drop of the intermediate layer membrane, showed a small increase (i.e., less than 10%) in the pressure drop in the heat-lamination of the non-woven fabric used as the air-permeable supporting member and, as a result, showed a small pressure drop (less than 45 mmH$_2$O) of each filter medium. Further, the filter media 1 to 7 showed each a collection efficiency of 99.9999% or more and a PF value exceeding 17. In contrast to this, the filter media 9 and 12 showed each a large increase (exceeding 18%) in the pressure drop in the heat-lamination of the non-woven fabric, thus exhibiting an excessively large pressure drop. Although the filter medium 11 showed a small pressure drop in the heat-lamination, it achieved only a low collection efficiency, which makes it inadequate as a filter medium.

Table 3 shows the leakage performances of the filter media obtained in the above Examples and Comparative Examples.

TABLE 3

| Sample | | Leakage frequency (leakage number/measurement points) |
| --- | --- | --- |
| Ex. 1 | filter medium 2 | 0/60 |
| Ex. 2 | filter medium 3 | 3/60 |
| Ex. 3 | filter medium 5 | 8/60 |
| Ex. 4 | filter medium 7 | 0/60 |
| Comp. Ex. 1 | filter medium 9 | 15/60 |
| Comp. Ex. 2 | filter medium 11 | 22/60 |
| Comp. Ex. 3 | filter medium 12 | 33/60 |

As shown in Table 3, the filter media 2, 3, 5 and 7 are superior also in the leakage performance to the filter media 9, 11 and 12.

As described above, the present invention provides filter media for air filters, which can exhibit the collection performance inherent to porous PTFE membranes, by using a membrane capable of sufficiently relieving the influence of processing for obtaining a filter medium for air filters as a membrane to be located as the outermost layer in a porous PTFE membrane laminate composed of at least three layers.

What is claimed is:

1. A filter medium for air filters, comprising as a collection layer a laminate of at least three layers of porous polytetrafluoroethylene membranes, wherein said laminate includes a first porous polytetrafluoroethylene membrane located as an outermost layer and a second porous polytetrafluoroethylene membrane located as at least one intermediate layer excluding said outermost layer, and said first porous polytetrafluoroethylene membrane has a pressure drop of no greater than ½ the pressure drop of said second porous polytetrafluoroethylene membrane.

2. The filter medium for air filters as claimed in claim 1, which further comprises air-permeable supporting members bonded to both outermost layers of said laminate.

3. The filter medium for air filters as claimed in claim 2, wherein said air-permeable supporting member has a pressure drop no greater than 1.15 of the pressure drop of said laminate.

4. The filter medium for air filters as claimed in claim 2 or 3, wherein said air-permeable supporting member is a non-woven fabric comprising a composite fiber having a core-shell structure wherein a core component has a melting point higher than that of a shell component.

* * * * *